(12) United States Patent
Yana Motta et al.

(10) Patent No.: US 8,038,899 B2
(45) Date of Patent: Oct. 18, 2011

(54) REFRIGERANT COMPOSITIONS HAVING A SILOXANE SOLUBILIZING AGENT

(75) Inventors: Samuel F. Yana Motta, East Amherst, NY (US); Elizabet Vera Becerra, East Amherst, NY (US); Mark Spatz, East Amherst, NY (US); David P. Wilson, East Amherst, NY (US); Raymond Hilton Thomas, Pendleton, NY (US)

(73) Assignee: Honeywell International Inc., Morristown, NJ (US)

( * ) Notice: Subject to any disclaimer, the term of this patent is extended or adjusted under 35 U.S.C. 154(b) by 23 days.

(21) Appl. No.: 12/430,180

(22) Filed: Apr. 27, 2009

(65) Prior Publication Data

US 2009/0267019 A1 Oct. 29, 2009

Related U.S. Application Data

(60) Provisional application No. 61/048,253, filed on Apr. 28, 2008.

(51) Int. Cl.
*C09K 5/04* (2006.01)
(52) U.S. Cl. .......................................................... 252/68
(58) Field of Classification Search .................. 252/68
See application file for complete search history.

(56) References Cited

U.S. PATENT DOCUMENTS

| | | | |
|---|---|---|---|
| 4,755,316 A | 7/1988 | Magid et al. | |
| 4,971,712 A | 11/1990 | Gorski et al. | |
| 4,975,212 A | 12/1990 | Thomas et al. | |
| 5,008,028 A | 4/1991 | Jolley et al. | |
| 6,063,748 A * | 5/2000 | Flynn et al. | 510/411 |
| 6,235,700 B1 * | 5/2001 | Flynn et al. | 510/411 |
| 6,288,018 B1 * | 9/2001 | Flynn et al. | 510/411 |
| 6,403,846 B1 * | 6/2002 | Sekiya et al. | 570/134 |
| 6,438,990 B1 * | 8/2002 | Hertling | 62/434 |
| 6,942,820 B2 * | 9/2005 | Ihara et al. | 252/69 |
| 7,018,558 B2 | 3/2006 | Schnur et al. | |
| 2001/0019120 A1 | 9/2001 | Schnur et al. | |
| 2003/0077329 A1 * | 4/2003 | Kipp et al. | 424/489 |
| 2006/0022166 A1 | 2/2006 | Wilson et al. | |
| 2009/0302264 A1 * | 12/2009 | Serrano et al. | 252/68 |

FOREIGN PATENT DOCUMENTS

WO WO/98/51650 A1 11/1998

OTHER PUBLICATIONS

Frank R. Biancardi et al., "Study of Lubricant Circulation in HVAC Systems," Report DOE/CE/23810-71-vol. 2, Final Technical Report, Mar. 1995-Apr. 1996, Prepared for the Air Conditioning and Refrigeration Technology Institute, Oct. 1996. US.

Ralph C. Downing, "Fluorocarbon Refrigerants Handbook," pp. 206-270, Ed. Prentice Hall (1998). US.

Milos Hudlicky, Ed., "The Journal of Fluorine Chemistry, or Chemistry of Organic Fluorine Compounds," pub. The MacMillan Company, New York, NY (1962). US (Too voluminous).

* cited by examiner

*Primary Examiner* — Douglas Mc Ginty
(74) *Attorney, Agent, or Firm* — Colleen D. Szuch

(57) ABSTRACT

Provided are refrigerant compositions which are blends of one or more hydrofluorocarbons, siloxanes, hydrocarbons and lubricants, as well as methods for using these compositions in applications such as the recharging of refrigeration systems and for replacing a chlorofluorocarbon or hydrochlorofluorocarbon in a refrigeration system.

16 Claims, 2 Drawing Sheets

REFRIGERANT COMPOSITIONS HAVING A SILOXANE SOLUBILIZING AGENT

CROSS-REFERENCE TO RELATED APPLICATIONS

This application claims the priority benefit of U.S. Provisional Patent Application No. 61/048253, filed Apr. 28, 2008, which is incorporated herein by reference.

BACKGROUND OF THE INVENTION

1. Field of Invention

This invention relates to a solubilizing agent for a refrigerant. More particularly, this invention relates to a solubilizing agent for improving the miscibility of conventional lubricants fluorinated-alkane, -alkene, and -ether refrigerants.

2. Description of The Related Art

Certain chlorofluorocarbons (CFCs) and hydrochlorofluorocarbon (HCFCs), such as dichlorofluoromethane (R-12), monochlorodifluoromethane (R-22), and azeotropic mixtures of monochlorodifluoromethane and chloropentafluoroethane (R-115) (known as R-502), have thermodynamic properties and chemical stability that make them useful as refrigerants. However, these chlorine-containing refrigerants are believed to interfere with the Earth's ozone layer. Therefore, the use of CFCs and HCFCs have become highly regulated and disfavored for heating and cooling applications.

Certain hydrofluorocarbons (HFCs), hydrofluoroolefins (HFOs), hydrofluoroethers (HFEs), and blends thereof are of particular interest as alternatives to CFCs and HCFCs because they have properties that are similar to chlorofluorocarbons, including similar refrigeration characteristics, but are much more environmentally friendly. Many of these compounds have vapor pressure that is ±20 percent of a comparable CFC or HCFC refrigerant at the same temperature, and have similar chemical stability, low toxicity, non-flammability, efficiency in-use, and low temperature glides.

HFCs known to be exceptionally good refrigerants include difluoromethane (R-32), 1,1,1,2,2-pentafluoroethane (R-125), 1,1,1-trifluoroethane (R-143a), 1,1,1,2-tetrafluoroethane (R-134a), and 1,1-difluoroethane (R-152a). Certain blends of two or more of these HFCs can also be used to achieve particular thermodynamic properties. Common HFC blends include an azeotrope-like blend of R-143a and R-125 (known as R-507A), a non-azeotropic blend of R-125, R-143a, and R-134a (known as R-404A), a non-azeotropic blend of R-32 and R-125 (known as R-410A), and a non-azeotropic blend of R-32, R-125, and R-134a (known as R-407C). These alternative refrigerants are available commercially from various sources including Honeywell International Inc. of Morristown, N.J.

Each of these HFCs or HFC blends can serve as a replacement for one or more CFCs or HCFCs. For example, R-134a can serve as replacement of R-12 in refrigeration and air conditioning applications such as chillers; R-404A and R-507A can serve as replacements for R-502 in most refrigeration applications, including high, medium and low evaporation temperature systems; R410A can serve as replacement of R-22 in new air conditioning and refrigeration equipment: and R-407C can serve as a replacement for R-22 in various air-conditioning applications, as well as in most refrigeration systems including chillers. It has also become desirable to retrofit chlorine-containing refrigeration systems by replacing chlorine-containing refrigerants with non-chlorine-containing refrigerants that will not deplete the ozone layer.

To be a feasible refrigerant replacement, the HFC, HFO, or HFE must be compatible with conventional lubricants used in refrigeration systems. Refrigeration system designers are interested in how the lubricant behaves in the system so that they can design piping and other components to best manage lubricant return to the compressor. The behavior of a refrigerant with a lubricant entering the system can affect film characteristics on heat transfer surfaces, and thus energy efficiency performance. In the absence of solubility, oils tend to become lodged in the coils of the compression refrigeration, air-conditioning or heat pump system evaporator, as well as other parts of the system, thereby reducing the system efficiency. Thus, miscibility of the lubricant with the liquid refrigerant over a wide range of operating temperatures is an important consideration in selecting a refrigerant. Unfortunately, many HFCs are relatively insoluble and/or immiscible in the conventional lubricants, including mineral oils that are miscible with HCFCs. For example, mineral oil and alkyl benzenes, which have been used with conventional refrigerants such as R-12, R-502 and R-22, are immiscible with HFCs. This lack of lubricant compatibility has hindered the commercial use of many HFC as refrigerants.

HFC have been used as refrigerants in combination with alternative lubricants such as polyol ester (POE) or other synthetic lubricants. However, retrofitting refrigeration systems with HFC refrigerants is still problematic. More particularly, retrofitting refrigeration or air conditioning systems with HFC refrigerants typically requires draining as much of the lubricant oil as possible before introducing the new refrigerants with synthetic lubricants. This process often involves removing the compressor from the system so that the lubricant can be adequately drained. For these and other reasons, it would be highly desirable to retrofit a CFC or HCFC system with HFCs without having to remove the system's lubricant. If HFCs could be used with conventional lubricants, such a retrofit would become a simple "drop-in" operation. That is, the existent refrigerant would be replaced with a new refrigerant without any further change in, or disassembly of the system hardware.

Accordingly, there exists a need to improve the solubility of HFCs in conventional refrigeration lubricants.

SUMMARY OF THE INVENTION

Applicants have discovered that the miscibility of an HFC in conventional lubricants is unexpectedly and significantly increased by blending the HFC with a solubilizing agent comprising one or more siloxanes, and optionally, one or more hydrocarbons (HCs). In addition, it has been found that certain blends of HFCs, siloxanes, and HCs generally retain the thermodynamic properties of the HFC alone. Accordingly, blends of HFCs, HCs and siloxanes can be used to retrofit HCFC refrigeration systems without having to drain or replace the system's conventional lubricants.

In one aspect, the present invention provides a composition comprising: (a) a refrigerant selected from the group consisting of a hydrofluorocarbon, hydrofluoroolefin, hydrofluoroether, and blends thereof; (b) a solubilizing agent comprising at least one siloxane and, optionally, at least one hydrocarbon selected from the group consisting of: $C_1$-$C_6$ branched or straight chain alkane, alkene, or alkyl, and a $C_3$-$C_6$ cyclic hydrocarbon; and (c) a refrigeration system lubricant.

In another aspect of the invention, provided is a method for recharging a refrigerant system comprising: (a) removing at least a portion of a chlorine-containing refrigerant from a refrigeration system comprising said chlorine-containing refrigerant and a lubricant, while retaining a majority of said lubricant in said system; and (b) adding a replacement refrigerant composition to said refrigeration system either subsequent to, or simultaneously with, said removing step, wherein said replacement refrigerant composition comprises a refrigerant selected from the group consisting of hydrofluorocarbon, hydrofluoroolefin, hydrofluoroether, and blends thereof; and a solubilizing agent comprising at least one siloxane and, optionally, at least one hydrocarbon selected from the group consisting of: $C_1$-$C_6$ branched or straight chain alkane, alkene, or alkyl, and a $C_3$-$C_6$ cyclic hydrocarbon.

In another aspect of the invention, provided is a method for improving the solubility of a refrigerant in a lubricant comprising: contacting a refrigerant selected from the group consisting of a hydrofluorocarbon, hydrofluoroolefin, hydrofluoroether, and blends thereof, with a lubricant selected from the group consisting of mineral oil, hydrocarbon oil, alkyl benzene oil, white or paraffinic oil, polyalkylene glycols, polyalkylene glycol esters, polyol esters, polyalphaolefins, and combinations thereof, wherein said contacting is performed in the presence of a solubilizing agent comprising a siloxane, and optionally, at least one hydrocarbon selected from the group consisting of: $C_1$-$C_6$ branched or straight chain alkane, alkene, or alkyl, and a $C_3$-$C_6$ cyclic hydrocarbon.

In yet another aspect of the invention, provided is a refrigerant composition comprising a refrigerant selected from the group consisting of a $C_1$-$C_6$ hydrofluorocarbon, $C_2$-$C_4$ hydrofluoroolefin, $C_5$-$C_6$ hydrofluoroether, and blends thereof and solubilizing agent comprising at least one siloxane selected from the group consisting of hexamethyldisiloxane, octamethyltrisiloxane, hexaethyldisiloxane, and octaethyltrisiloxane.

DESCRIPTION OF THE INVENTION

Figure 1:
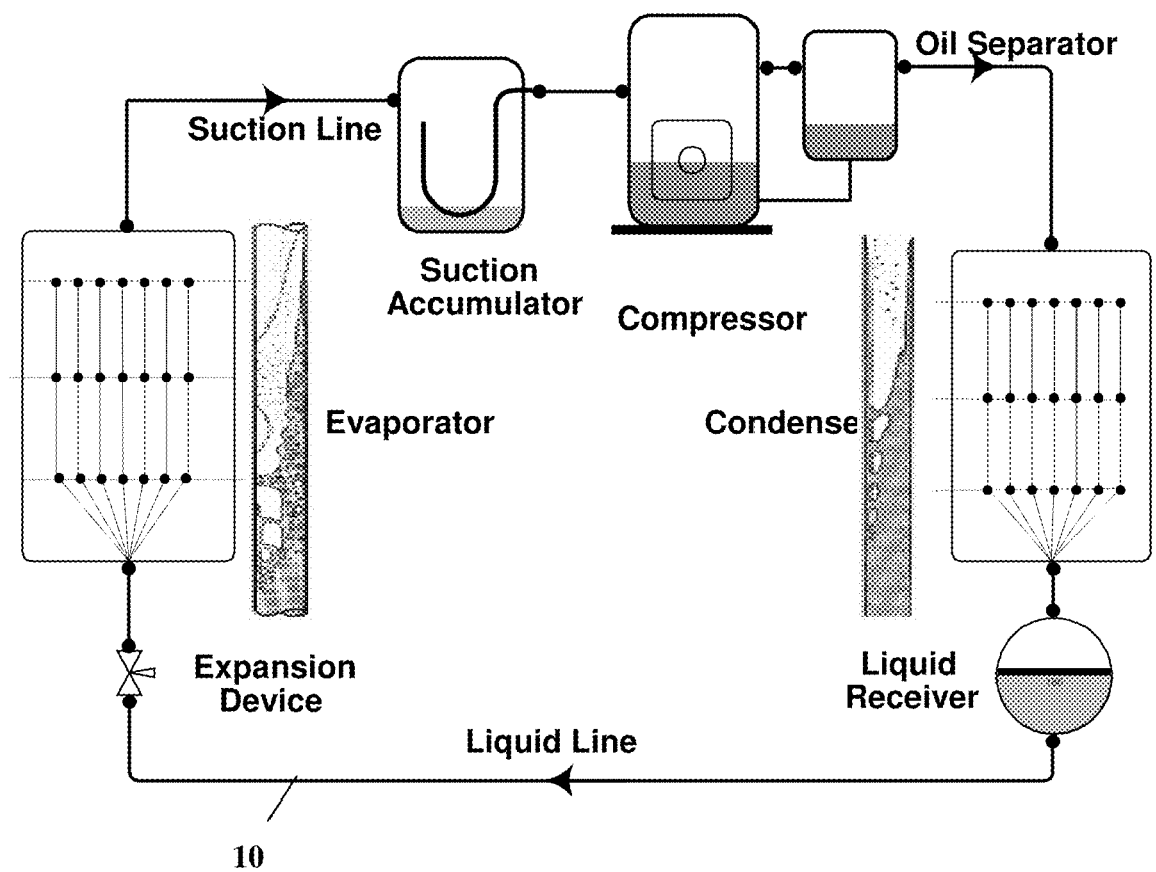
FIG. 1 is a commercial refrigeration system comprising a refrigerant composition of the present invention.

The compositions of the present invention are particularly useful as refrigerants in compression-type refrigeration systems. In certain embodiments, the composition comprises a refrigerant selected from the group consisting of a hydrofluorocarbon, hydrofluoroolefin, hydrofluoroether, and blends thereof; a solubilizing agent comprising at least one siloxane, and optionally, a low-boiling hydrocarbon; and a refrigeration system lubricant.

In certain preferred embodiments, the refrigerant is a hydrofluorocarbon, more preferably a $C_1$-$C_6$ hydrofluorocarbon, and even more preferably a $C_1$-$C_6$ hydrofluorocarbon having a normal boiling point of from about −90° C. to 80° C. Representative hydrofluorocarbons include: $CHF_3$ (HFC-23), $CH_2F_2$ (HFC-32), $CH_3F$ (HFC-41), $CF_3CF_3$ (FC-116), $CHF_2CF_3$ (HFC-125), $CHF_2CHF_2$ (HFC-134), $CH_2FCF_3$ (HFC-134a), $CHF_2CH_2F$ (HFC-143), $CF_3CH_3$ (HFC-143a), $CHF_2CH_3$ (HFC-152a), $CHF_2CF_2CF_3$ (HFC-227ca), $CF_3CFHCF_3$ (HFC-227ea), (HFC-236ca), $CH_2FCF_2CF_3$ (HFC-236cb), $CHF_2CHFCF_3$ (HFC-236ea), $CF_3CH_2CF_3$ (HFC-236fa), $CH_2FCF_2CHF_2$ (HFC-245ca), $CH_3CF_2CF_3$ (HFC-245cb), $CHF_2CHFCHF_2$ (HFC-245ea), $CH_2FCHFCF_3$ (HFC-245eb), $CHF_2CH_2CF_3$ (HFC-245fa), $CH_2FCF_2CH_2F$ (HFC-254ca), $CH_2CF_2CHF_2$ (HFC-254cb), $CH_2FCHFCHF_2$ (HFC-254ea), $CH_3CHFCF_3$ (HFC-254eb), $CHF_2CH_2CHF_2$ (HFC-254fa), $CH_2FCH_2CF_3$ (HFC-254fb), $CH_3CF_2CH_3$ (HFC-272ca), $CH_3CHFCH_2F$ (HFC-272ea), $CH_2FCH_2CH_2F$ (HFC-272fa), $CH_3CH_2CF_2H$ (HFC-272fb), $CH_3CHFCH_3$ (HFC-281ea), $CH_3CH_2CH_2F$ (HFC-281fa), $CHF_2CF_2CF_2CF_2H$ (HFC-338pcc), $CF_3CHFCHFCF_2CF_3$ (HFC-43-10mee), $C_4F_9OCH_3$, and $C_4F_9OC_2H_5$, and combinations thereof. Of these, difluoromethane; 1,1,1,2,2-pentafluoroethane; 1,1,1-trifluoroethane; 1,1,1,2-tetrafluoroethane; and 1,1-difluoroethane are particularly preferred.

Combinations of two or more hydrofluorocarbons are also useful as refrigerants in the present invention. Particularly preferred combinations include a combination of pentafluoroethane, tetrafluoroethane, and trifluoroethane; a combination of pentafluoroethane and trifluoroethane; a combination of difluoromethane and pentafluoroethane; a combination of difluoromethane, pentafluoroethane, and tetrafluoroethane; and a combination of difluoromethane, pentafluoroethane, and tetrafluoroethane. Particularly preferred combinations include HFC-404a, a combination of pentafluoroethane, tetrafluoroethane, and trifluoroethane in a ratio of about 44%:4%:52%; HFC-507a, a combination of pentafluoroethane and trifluoroethane in a ratio of about 50%:50%; HFC-410a, a combination of difluoromethane and pentafluoroethane in a ratio of about 50%:50%; HFC-407a, a combination of difluoromethane, pentafluoroethane, and tetrafluoroethane in a ratio of about 30%:40%:40%; and HFC-407c, a combination of difluoromethane, pentafluoroethane, and tetrafluoroethane in a ratio of about 20%:25%:52%.

These hydrofluorocarbon refrigerants are commercially available, for example, from Honeywell International Inc of Morristown, N.J.

In certain preferred embodiments, the refrigerant is a hydrofluoroolefin (HFO), preferably having a normal boiling point of about −90° C. to 80° C. More preferably, the hydrofluoroolefin is $C_2$-$C_6$ HFO, even more preferably a $C_3$-$C_4$ HFO, and even more preferably a trifluoropropene, tetrafluoropropene, or pentafluoropropane, including each structural and stereoisomer thereof. Examples of preferred HFOs include, but are not limited to, $CF_3CF=CH_2$ (HFO-1234yf), 1,3,3,3-tetrafluoropropene (HFC-1234ze), and (Z)-1,1,1,2,3-pentafluoropropene (HFO-1225yeZ).

In preferred embodiments, the solubility agent increases the miscibility of the refrigerant in a conventional refrigeration system lubricant, such as mineral oil. The solubility agent comprises an effective amount of a high-boiling siloxane, and optionally, may also include a low-boiling hydrocarbon. By high-boiling it is meant a compound having a normal boiling point of about 90° C. or above, more preferably about 90° C. to about 200° C., and even more preferably about 100° C. to about 155° C. By low-boiling it is meant a compound having a normal boiling point of not more than about 85° C., preferably about −165° C. to about 85° C., more preferably about −50° C. to about 10° C., and even more preferably about −25° C. to about 0° C.

Preferred siloxanes include those of Formula (I):

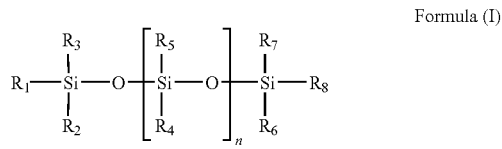

Formula (I)

wherein $R_1$-$R_8$ is independently H, $C_1$-$C_4$ alkyl, or $C_6$-$C_{10}$ aryl, and n is an integer from 0 to 10.

In particularly preferred embodiments, n is 1 to 4 and $R_1$-$R_8$ is independently H or $C_1$-$C_3$ alkyl, provided that a majority $R_1$-$R_8$ is a $C_1$-$C_3$ alkyl. In other preferred embodiments, n is 0 or 1 and all of $R_1$-$R_8$ is methyl or all of $R_1$-$R_8$ is ethyl (e.g., hexamethyldisiloxane, octamethyltrisiloxane, hexaethyldisiloxane, octaethyltrisiloxane). A particularly preferred siloxane is hexamethyldisiloxane.

Solubilizing agents preferably have both a high-boiling siloxane and a low-boiling hydrocarbon. Preferred hydrocarbons include $C_1$-$C_6$ branched or straight chain alkanes, $C_2$-$C_6$ branched or straight chain alkenes, $C_2$-$C_6$ branched or straight chain alkyls, and $C_3$-$C_6$ cycloalkanes. Useful $C_1$-$C_6$ hydrocarbons non-exclusively include methane, ethane, propane, propene, propyne, cyclopropane, 2,2-dimethylpropane, butane, isobutane, 2-methylbutane, pentane, isopentane, 3-methylpentane, hexane, cyclohexane, isohexane, or combinations thereof.

As noted above, the solubilizing agent preferably improves the miscibility of hydrofluorocarbon (HFC), hydrofluoroolefin (HFO), and hydrofluoroether (HFE) refrigerants in conventional refrigeration system lubricants. Such lubricants include mineral oil, hydrocarbon oil, alkyl benzene oil, white or paraffinic oil, polyalkylene glycols, polyalkylene glycol esters, polyol esters, polyalphaolefins, and combinations thereof. Useful mineral oils include paraffins (i.e. straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). The mineral oils useful for the present invention include those commonly known as "synthetic oils" in the field of compression refrigeration lubrication. Synthetic oils comprise alkylaryls (i.e. linear and branched alkyl alkylbenzenes), synthetic paraffins and napthenes, and poly(alphaolefins). Commercially available mineral oils include Witco LP 250® from Witco, Zerol 300® from Shrieve Chemical, Sunisco 3GS from Witco, and Calumet R015 from Calumet. Other useful mineral oils are commercially available as BVM 100 N (paraffinic mineral oil sold by BVA Oils), Suniso® 3GS (napthenic mineral oil sold by Crompton Co.), Sontex® 372LT (napthenic mineral oil sold by Pennzoil), Calumet® RO-30 (napthenic mineral oil sold by Calument Lubricants), Zerol® 75 and Zerol® 150 (linear alkylbenzenes sold by Shrieve Chemicals) and HAB 22 (branched alkylbenzene sold by Nippon Oil). The chemical compositions and uses of these oils are well known (see e.g. "Fluorocarbon Refrigerants Handbook" by Ralph C. Downing, Prentice Hall, 1998, pp. 206-270). Polyalkylene glycol refrigeration lubricants are disclosed in U.S. Pat. Nos. 4,755,316; 4,971,712, and 4,975,212, each of which is incorporated herein by reference. Polyalkylene glycol esters are disclosed in U.S. Pat. No. 5,008,028 which is incorporated herein by reference.

In a preferred embodiment the HFC, HFO, or HFE is present in the refrigerant composition in an amount of from about 40 weight percent to about 98.8 weight percent of the overall refrigerant composition, more preferably about 72 weight percent to about 98.8, and even more preferably about 85 weight percent to about 99.8 weight percent. In a preferred embodiment the siloxane is present in the refrigerant composition in an amount of from about 0.1 weight percent to about 50 weight percent of the overall refrigerant composition, more preferably about 0.1 weight percent to about 20 weight percent and even more preferably about 0.1 weight percent to about 10 weight percent. In a preferred embodiment, the hydrocarbon is present in the refrigerant composition in an amount of from about 0.1 weight percent to about 10 weight percent of the overall refrigerant composition, more preferably from about 0.1 weight percent to about 8 weight percent, and even more preferably about 0.1 weight percent to about 5 weight percent. In a preferred embodiment, the lubricant is present in the refrigerant composition in an amount of from about 1 to about 50 percent by weight of the overall refrigerant composition, more preferably about 1 to about 40 percent by weight, and even more preferably about 1 to about 30 percent by weight.

The compositions of the present invention may further include any of a variety of optional additives including other lubricants, stabilizers, metal passivators, corrosion inhibitors, flammability suppressants, and the like. According to certain embodiments, the compositions of the present invention further comprise a stabilizer. Any of a variety of compounds suitable for stabilizing a composition of the present invention may be used. Examples of certain preferred stabilizers include stabilizer compositions comprising stabilizing diene-based compounds, and/or phenol compounds, and/or epoxides. Epoxides include aromatic epoxides, alkyl epoxides, alkenyl epoxides, and combinations thereof. Certain compositions may comprise a diene-based compound in an amount effective under conditions of use to stabilize the composition against degradation. As the term is used herein, "diene-based compound" refers to $C_3$-$C_5$ dienes and to compounds formed by reaction of any two or more $C_3$-$C_5$ dienes. In the case of diene-based compounds which are formed by a combination of $C_3$-$C_5$ dienes, the molecules which are combined can be the same or different. In preferred embodiments the diene-based compounds are selected from the group consisting of allyl ethers, propadiene, butadiene, isoprene, terpenes such as myrcene, terpene derivatives and combinations of any two or more of these. Any of a variety of phenol compounds are also suitable for use as stabilizers in the present compositions. As used herein the term "phenol compound" refers generally to any substituted or unsubstituted phenol. Examples of suitable phenol compounds include phenols comprising one or more substituted or unsubstituted cyclic, straight-chain, or branched aliphatic substituent group, such as, alkylated monophenols including: 2,6-di-tert-butyl-4-meth-ylphenol; 2,6-di-tert-butyl-4-ethylphenol; 2,4-dimethyl-6-tert-butylphenol; tocopherol; and the like. In certain embodiments, the epoxide, diene or phenolic stabilizer compounds may be present in the refrigerant composition in amounts of from about 0.001% to about 10% by weight, more preferably from about 0.01 wt. % to about 5 wt. %, and even more preferably from about 0.3 wt. % to about 4 wt. %, based on the total weight of the refrigerant composition.

The invention further provides a method of recharging a refrigeration system or a refrigeration apparatus may be retrofit with a new refrigerant composition. The refrigeration system or apparatus to be recharged or retrofit preferably contains a refrigerant comprising a chlorofluorocarbon, a hydrochlorofluorocarbons, or combination thereof, along with a lubricant. The old refrigerant composition is removed and substituted with the inventive refrigeration composition described herein.

The refrigerant compositions of the present invention preferably operate in compression-type refrigeration/heat pump system, i.e., the refrigerant circulates in the refrigeration apparatus such that the refrigeration system generates refrigeration. This technique is useful for automotive, household and industrial size air conditioners, refrigeration systems and heat pumps. A refrigeration system comprising a refrigeration apparatus and a refrigerant composition 10 as described herein circulating in the refrigeration apparatus is show in FIGS. 1 and 2.

EXAMPLES

The following non-limiting examples serve to illustrate the invention.

Example 1

Performance

This example demonstrates the thermodynamic properties of a HFC/HMDS and HFC/HMDS/HC blends.

Testing was performed in a refrigeration apparatus under typical operating conditions using a refrigerant test mixture and mineral oil (Nu-Calgon C-3 Refrigeration Oil). The test mixtures composition were as follows:

Blend 1: 96 wt. % of HFC (R407C) and 4 wt. % of HMDS
Blend 2: 97 wt. % of HFC (R407C), 2 wt. % of HMDS and 1 wt % of isobutane.

Testing was performed using a setup similar to the unit described in Report DOE/CE/23810-71 "Study of Lubricant Circulation in HVAC Systems," March 1995-April 1996 by Frank R. Biancardi et. al. (prepared for Air Conditioning and Refrigeration Technology Institute Under ARTI/MCLR Project No. 665-53100), which is incorporated herein by reference. In this case, commercial refrigeration system equipment was employed using a commercially available condensing unit and an evaporator for a walk-in freezer/cooler (see FIG. 1). The following is a detailed description of the equipment:

The condensing unit was as manufactured by Keeprite Refrigeration, Brantford, Ontario Model K350L2 outdoor, air cooled, low temperature, R-22 condensing unit equipped with a 2DF-0300 Copeland compressor, a fin-and-tube coil, and a demand cooling system for low temperature operation. It also has a suction accumulator, an oil separator, a receiver, a two-valve head pressure control system, and other standard operating controls.

The evaporator was as manufactured by Keeprite Refrigeration. A Model KUCB204DED electric defrost, low profile DX fed evaporator with electric defrost heaters and a Sporlan distributor and TXV. Capacity was rated as 17,340 BTUH @–20° F. SST, 10 degree TD, and 3,200 CFM air flow. The evaporator was installed in an environmentally controlled chamber that served as the walk-in freezer/cooler. The condenser unit was installed in another chamber to control temperature. Instrumentation was added to the system to measure refrigerant mass flow rate, refrigerant pressure and temperature before and after each component, air temperature and flow in/out of evaporator and condenser, and power to condensing unit and evaporator. Tests were run at one typical freezer temperatures (20° F.), and an ambient temperatures of 80° F. It should be noted that the refrigerant temperatures were typically 15° F. to 20° F. lower than the chamber temperatures. Table 1 shows performance results compared to R407C.

For these two blends, both capacity and COP do not change significantly respect of pure R407C. Therefore, addition of HMDS or HMDS/HC solubilizing additives do not affect the system performance of an HFC-type fluid.

TABLE 1

| Refrigerant | Cooling Capacity | | Efficiency (COP) | |
|---|---|---|---|---|
| | Tons | % | | % |
| R407C | 2.13 | 100.0% | 1.61 | 100.0% |
| 96% R407C/4% HMDS | 2.09 | 97.8% | 1.65 | 102.5% |
| 97% R407C/1% Isobutane/2% HMDS | 2.09 | 98.1% | 1.63 | 101.7% |

Example 2

Compatibility of Materials

Solubiliizing additives such as HMDS could introduce undesirable effects in certain components of the system. One of the most critical components is the expansion device because it is typically a flow restriction where deposition is possible. Standard industry tests are used to ensure no deposition and/or flow restriction is caused by the additives introduced in the system. The most commonly used test is the "Capillary Tube Clogging" test which consists of running a Standard refrigeration system using a capillary tube as a expansion device for a continuous period of 2000 h. Capillary tubes are inspected and mass flow measured using ASHRAE Std 28-1988 (Method of Testing Capacity of Refrigerant Capillary Tubes) at 500 h, 750 h, 100 h and at the end of the test (2000 h). Variations of ±3% are considered normal because they inside the range of experimental uncertainty of the measurements. Table 2 shows results obtained for two tests:

1. R407C using POE oil as lubricant
2. A blend consisting of 90 wt. % R407C and 10 wt. % of HMDS using Mineral oil as lubricant.

Mass flow changes measured at the end of test 1 was of +1.29% as expected for pure HFC with a compatible oil. Similarly, test 2 flow change was +1.05%. Therefore both of them are within the range of uncertainty proving the good compatibility of the HMDS with the mineral oil and other material present in the system.

TABLE 2

| Refrigerant | Mass Flow Change (%) |
|---|---|
| 100% R407C | +1.29% |
| 90% R407C/10% HMDS | +1.05% |

Example 3

System Test with HFC/HMDS/HC Blends

Figure 2:
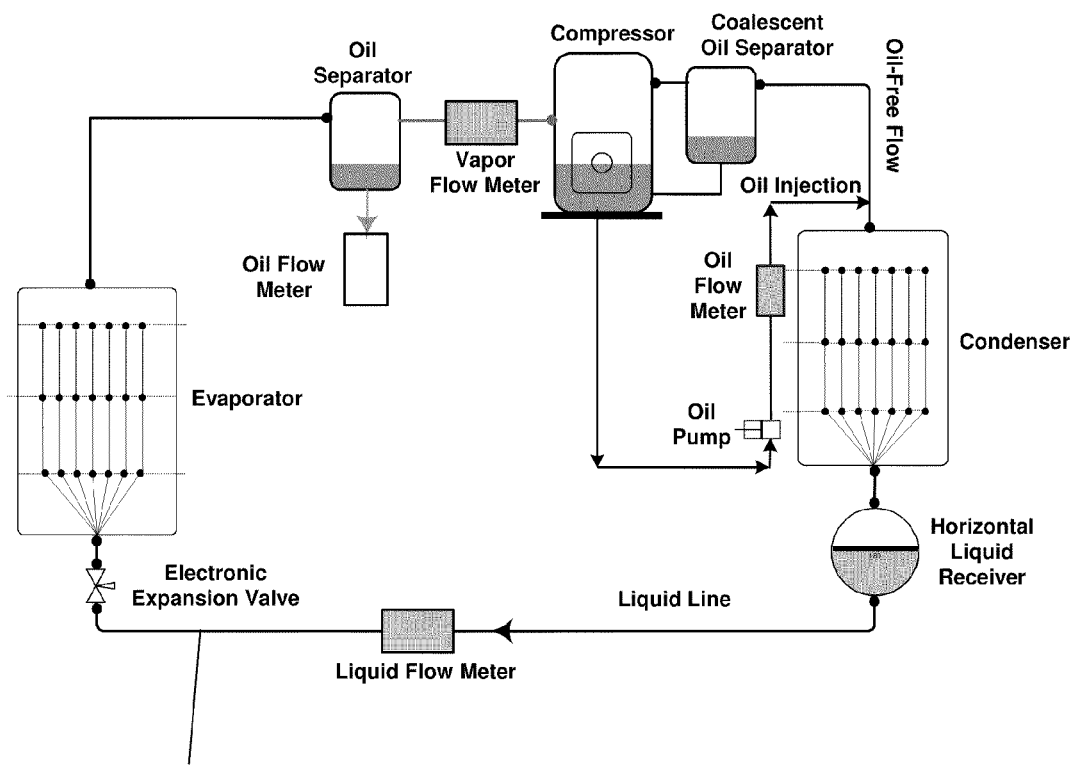
FIG. 2 is another commercial refrigeration system comprising a refrigerant composition of the present invention.

This example demonstrates that an HFC/HMDS/HC blend has better oil return properties in the liquid receiver of a refrigeration system as compared to a pure HFC. The intent of this experiment is to take advantage of the good solubility of high boiling hydrocarbons (e.g. Isobutane) but enhancing the solubility of the resulting blend by using HMDS as a low boiling solubilizing additive. These tests used the same equipment as described in Example 1, with the following modifications:

Two high-efficiency coalescent oil separators were added at the discharge of the compressor, so the stream after them was oil-free (below 50 ppm). A continuous oil injection system was designed to extract oil from the compressor sump and inject it at the inlet of the condenser, after the oil separators and before the liquid receiver (FIG. 2). This system comprises a high pressure oil pump, a metering valve and a mass flow meter, so we could impose a desired Oil Circulation Ratio (OCR), which is a relation by mass between oil and the total mass flow (refrigerant plus oil). Two sight glasses were added to the horizontal liquid receiver, to visually observe any oil accumulating or dissolving in the refrigerant. Oil circulation at the inlet of the liquid receiver was measured directly using the system and oil flow meters shown in FIG. 2. The OCR at the outlet of the receiver was measured using an oil separator at the outlet of the evaporator, which sends the vapor back to the system and the oil to flow meter. Verification measurements were done by sampling before and after the liquid receiver to measure directly the amount of oil passing through. These tests consisted in imposing an OCR of 0.40% (oil by mass) at the inlet of the liquid receiver and measuring it after. Table 3 shows results for the two blends described in Example 1:

Blend 1: 96 wt. % of HFC (R407C) and 4 wt. % of HMDS
Blend 2: 97 wt. % of HFC (R407C), 2 wt. % of HMDS and 1 wt % of isobutane Both blends were successful in improving oil circulation, which is shown on Table 3.

TABLE 3

| | Oil Circulation | | |
|---|---|---|---|
| Refrigerant | Inlet (%) | Outlet (%) | Outlet Improvement (%) |
| R407C | 0.40% | 0.10% | — |
| 96% R407C/4% HMDS | 0.40% | 0.35% | +250% |
| 97% R407C/1% Isobutane/2% HMDS | 0.40% | 0.36% | +260% |

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A method for recharging a refrigerant system comprising:
   a. removing at least a portion of a chlorine-containing refrigerant from a refrigeration system comprising said chlorine-containing refrigerant and a lubricant, while retaining a majority of said lubricant in said system; and
   b. adding a replacement refrigerant composition to said refrigeration system either subsequent to, or simultaneously with, said removing step, wherein said replacement refrigerant composition comprises a refrigerant selected from the group consisting of hydrofluorocarbon, hydrofluoroolefin, hydrofluoroether, and blends thereof; and a solubilizing agent comprising at least one siloxane and, optionally, at least one hydrocarbon selected from the group consisting of: $C_1$-$C_6$ branched or straight chain alkane, alkene, or alkyl, and a $C_3$-$C_6$ cyclic hydrocarbon.

2. The method of claim 1 wherein in said replacement refrigerant composition said siloxane is a compound of Formula (I):

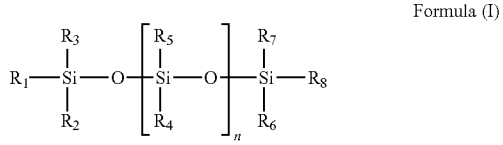

Formula (I)

wherein $R_1$-$R_8$ is independently H, $C_1$-$C_4$ alkyl, or $C_6$-$C_{10}$ aryl, and n is an integer from 0 to 10.

3. The method of claim 2 wherein n is 1 to 4 and $R_1$-$R_8$ is independently H or $C_1$-$C_3$ alkyl, provided that a majority $R_1$-$R_8$ is a $C_1$-$C_3$ alkyl.

4. The method of claim 3 wherein n is 0 or 1 and $R_1$-$R_8$ is methyl or $R_1$-$R_8$ is ethyl.

5. The method of claim 4 wherein said siloxane is hexamethyldisiloxane.

6. The method of claim 2 wherein said replacement refrigerant is a $C_1$-$C_6$ hydrofluorocarbon.

7. The method of claim 3 wherein said replacement refrigerant is selected from the group consisting of: difluoromethane; 1,1,1,2,2-pentafluoroethane; 1,1,1-trifluoroethane; 1,1,1,2-tetrafluoroethane; 1,1-difluoroethane; a combination of pentafluoroethane, tetrafluoroethane, and trifluoroethane; a combination of pentafluoroethane and trifluoroethane; a combination of difluoromethane and pentafluoroethane; a combination of difluoromethane, pentafluoroethane, and tetrafluoroethane; and a combination of difluoromethane, pentafluoroethane, and tetrafluoroethane.

8. The method of claim 2 wherein said replacement refrigerant is a $C_2$-$C_6$ hydrofluoroolefin.

9. The method of claim 8 wherein said replacement refrigerant is selected from the group consisting of: a trifluoropropene; a tetrafluoropropene; a pentafluoropropene; and mixture thereof.

10. The method of claim 9 wherein said replacement refrigerant is selected from the group consisting of: (E)-2,3,3,3-tetrafluoropropene; (Z)-2,3,3,3-tetrafluoropropene; 1,3,3,3-tetrafluoropropene, and (Z)-1,1,1,2,3-pentafluoropropene.

11. The method of claim 2 wherein said replacement refrigerant is a $C_5$-$C_6$ hydrofluoroether.

12. The method of claim 1 wherein said refrigeration system lubricant is selected from the group consisting of: mineral oil, hydrocarbon oil, alkyl benzene oil, white or paraffinic oil, cycloparaffin, polyalkylene glycols, polyalkylene glycol esters, polyol esters, polyalphaolefins, and combinations thereof.

13. The method of claim 1 wherein said solubilizing agent further comprises at least one hydrocarbon selected from the group consisting of: $C_1$-$C_6$ branched or straight chain alkane, alkene, or alkyl, and a $C_3$-$C_6$ cycloalkane.

14. The method of claim 13 wherein said hydrocarbon is selected from the group consisting of methane, ethane, propane, propene, propyne, cyclopropane, 2,2-dimethylpropane, butane, isobutane, 2-methylbutane, pentane, isopentane, 3-methylpentane, hexane, cyclohexane, isohexane, or combinations thereof.

15. The method of claim 14 wherein said refrigerant is present in amount of about 40 to about 98.8 weight percent, said siloxane is present in an amount of about 0.1 to about 50 weight percent, said hydrocarbon is present in an amount of about 0.1 to about 10 weight percent, and said lubricant is present in an amount of about 1 to about 50 weight percent.

16. The method of claim 14 wherein said replacement refrigerant is present in amount of about 85 to about 98.8 weight percent, said siloxane is present in an amount of about 0.1 to about 10 weight percent, said hydrocarbon is present in an amount of about 0.1 to about 5 weight percent, and said lubricant is present in an amount of about 1 to about 30 weight percent.

* * * * *